Figure 1:
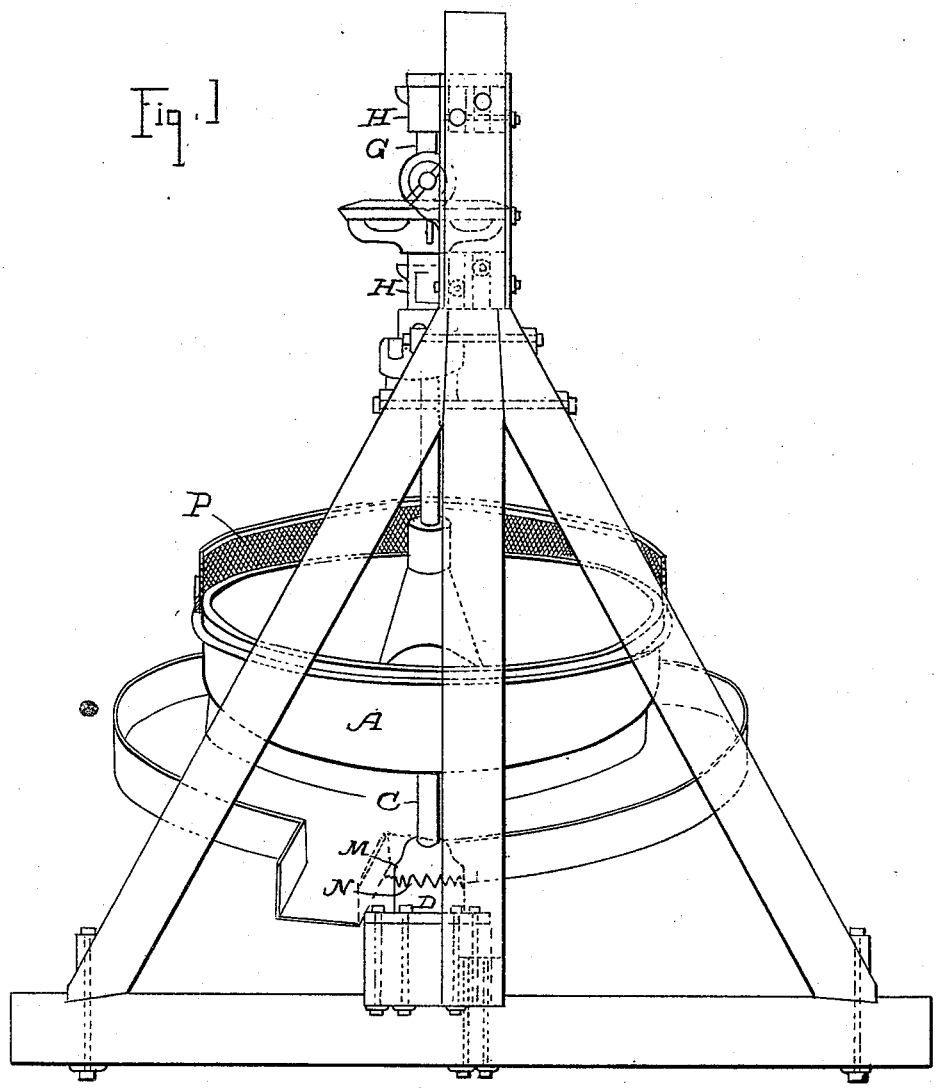

(No Model.)  2 Sheets—Sheet 1.

J. H. KINKEAD.
GRINDING PAN.

No. 492,962.  Patented Mar. 7, 1893.

Witnesses,
J. H. Nance
J. A. Bayless

Inventor,
James H. Kinkead
By Dewey & Co.
Attys

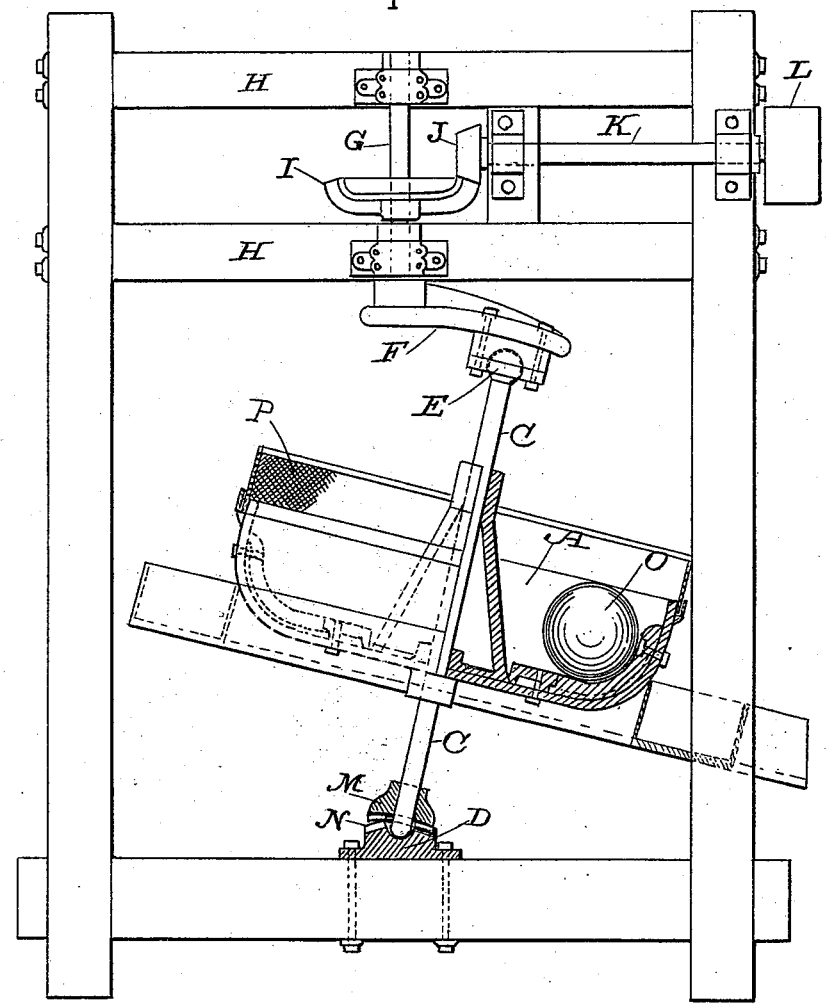

United States Patent Office.

JAMES H. KINKEAD, OF VIRGINIA CITY, NEVADA.

GRINDING-PAN.

SPECIFICATION forming part of Letters Patent No. 492,962, dated March 7, 1893.

Application filed June 9, 1892. Serial No. 436,142. (No model.)

*To all whom it may concern:*

Be it known that I, JAMES H. KINKEAD, a citizen of the United States, residing at Virginia City, Storey county, State of Nevada, have invented an Improvement in Grinding-Pans; and I hereby declare the following to be a full, clear, and exact description of the same.

My invention relates to an improvement in pans for grinding ores and other material.

It consists in certain details of construction which will be more fully explained by reference to the accompanying drawings, in which—

Figure 1 is a side elevation of the pan inclined toward the observer. Fig. 2 is an elevation partially in section, of the pan taken at right angles with Fig. 1.

A is an iron pan of any suitable diameter having an essentially flat bottom and vertical sides united by a curve of a quarter of a circle. The interior of this pan is lined with a die or dies properly secured therein and forming a removable surface upon which the grinding takes place. Through the center of the pan passes a shaft C which is keyed to the pan, and the lower end fits into a socket step D. The upper end of this shaft has a ball E formed upon it, and this fits into a correspondingly shaped socket or box upon the outer end of a crank F. The box may be made adjustable upon the crank so as to give a greater or less throw as may be desired. The crank is fixed to a vertical shaft G journaled in boxes upon the frame timbers H. A bevel-gear wheel I is fixed to this shaft, and a bevel-pinion J is fixed to the horizontal shaft K journaled upon the frame timbers, and having driving pulleys L upon the outer end through which power is applied to rotate the shafts and crank, and move the pan.

In order to prevent the pan itself from turning around I fix upon the lower end a hub M having teeth formed in its lower surface extending radially from the center toward the outside.

N is a corresponding set of teeth formed on the upper outer surface of the step in which the lower end of the pan shaft is supported. The two serrated faces are curved to have a radius corresponding with the amount of throw that the crank gives the pan, so that the teeth in the two surfaces will travel in contact, and while the pan is caused to revolve around the central step by the movement of the crank with which the upper end of the shaft is connected, it is prevented from rotating about its own center by means of these serrations or teeth.

Within the pan are placed one or more balls O of such size that the curvature corresponds with the inner curvature of the die which is fitted into the curved angle of the pan as previously described.

When the machine is set in operation, the pan revolving around its step constantly inclines so that each portion of the periphery of the pan becomes temporarily the lowest and at the opposite side of the rotation, the highest. This peculiar movement of the pan causes the ball or balls to roll around continuously in the interior, and if the speed is considerable, a centrifugal motion is developed which greatly assists in the grinding action of the balls. By reason of the peculiar motion of the pans, the balls are continuously rolling down hill and the least possible power is needed to keep the machine in operation.

Around the upper periphery of the pan is fixed a screen P, so that all the material as fast as it is pulverized fine enough, will pass out through this screen and fall into a surrounding circular sluice or trough which is arranged to catch the material as it passes out through the screens. By this construction I have a very effective and continuous grinding pan into which the ore may be delivered regularly and as regularly discharged through the screen when fine enough.

Having thus described my invention, what I claim as new, and desire to secure by Letters Patent, is—

1. An ore crushing device consisting of a pan with balls adapted to roll around the interior, a shaft extending upward through the center of the pan and secured thereto, a step in which the lower end of the shaft is retained, a vertical shaft in line above the step and above the upper side of the pan, means whereby said shaft is caused to rotate, a crank fixed to said shaft, a box fixed to the outer end of the crank adapted to form with the upper end of the pan shaft a ball and socket joint, a hub fixed around the bottom of the shaft having serrated radial teeth upon its lower surface, and a correspondingly serrated hub fixed around the step in which the lower end of the shaft turns whereby the two serrated surfaces engage each other and prevent the pan from rotating about its shaft while allowing it to revolve, substantially as herein described.

2. A crushing and grinding device consisting of a pan having dies fixed around the inner curved angle, and balls adapted to roll upon said dies, a shaft passing through the center of the pan supported in a step at the bottom with toothed or serrated hubs whereby the shaft and pan are prevented from rotating about their own axis, a vertical crank shaft in line above the step, a crank fixed to the lower end, a box into which the upper end of the pan shaft extends forming a ball and socket joint, means whereby the vertical shaft is rotated so as to cause the pan to revolve in an eccentric orbit around its step, screens fixed around the upper periphery of the pan for the discharge of the pulverized ore, and a circular sluice situated below the pan adapted to receive the discharge therefrom, substantially as herein described.

In witness whereof I have hereunto set my hand.

JAMES H. KINKEAD.

Witnesses:
  W. G. THOMPSON,
  C. C. PENDERGAST.